United States Patent

[11] 3,583,384

[72] Inventor Alden B. Ranisate
1640 Oakview Lane, Minneapolis, Minn. 55427
[21] Appl. No. 838,186
[22] Filed July 1, 1969
[45] Patented June 8, 1971

[54] STOVE ATTACHMENT
2 Claims, 4 Drawing Figs.
[52] U.S. Cl.................................................. 126/24, 126/42, 126/215, 220/69
[51] Int. Cl....................................................... F24c 15/10

[50] Field of Search........................................... 126/24, 42, 211, 214, 215; 220/69

[56] References Cited
UNITED STATES PATENTS
2,640,600  6/1953  Farr............................... 126/215UX
3,372,688  3/1968  Moore........................... 126/24

Primary Examiner—Charles J. Myhre
Attorney—Merchant and Gould

ABSTRACT: An open-topped receptacle for holding cooking utensils against lateral movement on a cooking stove grid and having grid-engaging members projecting downwardly therefrom.

PATENTED JUN 8 1971
3,583,384
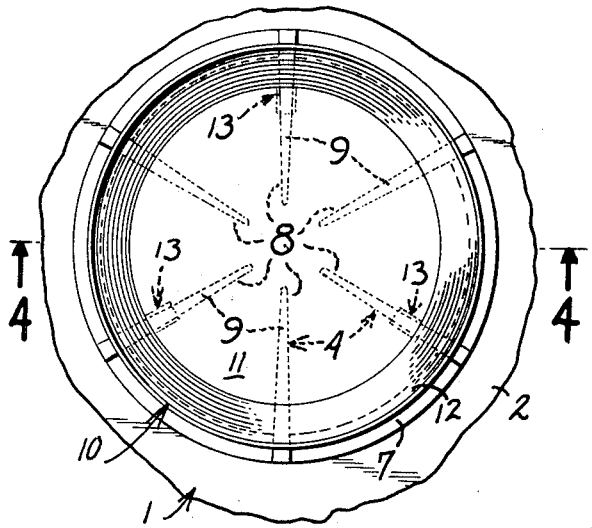
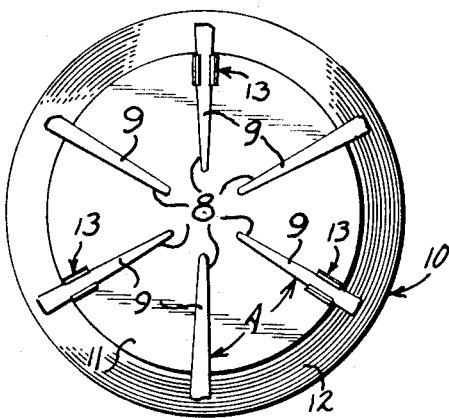
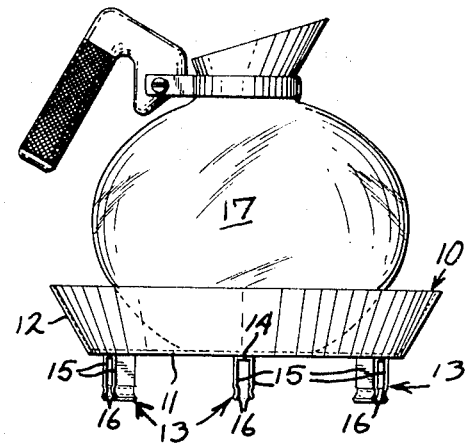
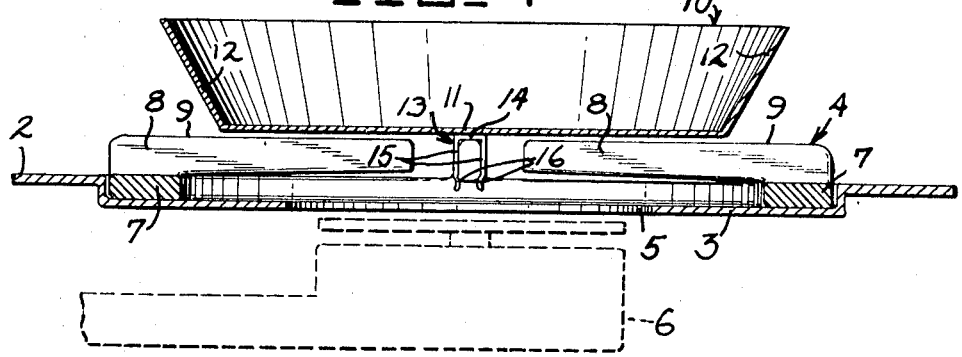
INVENTOR.
ALDEN B. RANISATE
BY *Merchant & Gould*
ATTORNEYS

STOVE ATTACHMENT

BACKGROUND OF THE INVENTION

It is well known that cooking ranges, galley stoves and the like, commonly using oil or gas for fuel, have utensil supporting grids comprising a plurality of circumferentially spaced radial fingers or bars on which the cooking utensils, such as pots and pans are placed. The utensils are free to slide laterally on the grids and are easily displaced by accident, particularly in mobile homes or travel trailers, boats and the like, where lateral movement of the vehicle often occurs, causing the utensils to slide off from the grids.

SUMMARY OF THE INVENTION

The attachment of this invention comprises an open-topped relatively shallow receptacle having a generally flat bottom portion and a utensil confining marginal flange portion projecting generally upwardly from the bottom portion. A plurality of circumferentially spaced anchoring members underlie the bottom portion and are rigidly secured thereto, the anchoring members operatively engaging given ones of the radial grid bars of the cooking range to hold the receptacle against lateral movement on the grid. The marginal flange portion defines an area of sufficient size to receive the cooking utensil and confine the utensil against all but limited lateral movement on the bottom portion of the attachment.

DESCRIPTION OF THE DRAWINGS

FIG. 1 is a fragmentary view in top plan of a conventional gas or oil fired cooking range with the attachment of this invention mounted on a grid thereof;

FIG. 2 is a view in bottom plan of the attachment of Fig. 1, showing the attachment thereof to the radial bars of a stove grid, some parts being broken away;

Fig. 3 is a view in side elevation of the attachment, showing a cooking utensil mounted therein; and Fig. 4 is an enlarged view in cross section, taken substantially on the line 4—4 of FIG. 1.

DETAILED DESCRIPTION OF THE PREFERRED EMBODIMENT

A conventional cooking range or stove, indicated generally at 1, is shown fragmentarily in FIGS. 1 and 4 as including a top plate 2 formed to provide one or more downwardly displaced portions 3, one of which is shown, which provide upwardly opening recesses for reception of utensil supporting grids 4, one of which is shown. The downwardly displaced portion 3 is provided with a central opening 5 which overlies the usual burner element 6, shown by dotted lines in FIG. 4, the burner element 6 being of the type usually employed in gas or oil fired cooking ranges or stoves. The grid 4 is also of the well-known variety usually included with such cooking stoves, the grid comprising a generally flat annular rim 7 which rests upon the displaced top portion 3, and a plurality of radially inwardly projecting utensil supporting bars or arms 8. Usually, the bars 8 have flat top surfaces 9 upon which a cooking utensil, such as a pot or pan, rests.

For convenience and easy availability of fuel, most present day mobile homes or travel trailers, as well as watercraft, such as cabin boats and houseboats are equipped with cooking stoves of the gas or oil fired variety, using grids as above described. When such a vehicle partakes of motion, such as movement of a trailer on a highway or rocking movement of a boat in rough water, a utensil resting on the grid 4 may easily slide therefrom to the floor of a vehicle with consequent spilling of the contents from the utensil and incurring possible danger to the occupants of the vehicle. Even in a stable environment, such as a permanently based dwelling, children or other persons may pass by the stove and accidentally jar the handle of a utensil on the stove sufficient to cause the utensil to slide away from the grid on which it rests.

The stove attachment of this invention comprises an open-topped traylike receptacle 10, having a generally flat bottom portion 11 and a generally upwardly projecting marginal flange portion 12, and a plurality of anchoring members in the nature of grid bar-engaging clips 13 underlying the bottom portion 11 and projecting downwardly therefrom in circumferentially spaced relationship. The receptacle 10 is preferably made from sheet metal, the anchoring clips 13 being preferably made from heat-resistant resilient metal formed into inverted generally U-shape to provide in each thereof a base portion 14 that is spot welded or otherwise rigidly secured to the bottom portion 11 of the receptacle 10, and a pair of laterally spaced downwardly projecting legs 15 that are adapted to straddle an adjacent one of the grid bars 8. The lower ends of the legs 15 are formed to provide detent portions 16 that partially underlie the adjacent grid bars 8, when the attachment is placed thereon, to prevent accidental removal of the receptacle 10 from the grid 4. The legs 15 are spaced apart a distance substantially equal to the average thickness of the grid bars 8, and are sprung slightly away from each other when the detent portions 16 engage opposite sides of a grid bar 8, when the receptacle 10 is being placed thereon The legs 15 are of such vertical length that, when the base portions 14 of the anchoring clips 13 rest upon the tops of the grid bars 8, the detent portions 16 will be disposed below the bottoms of the grid bars 8, permitting the legs 15 to return from their sprung apart relationship to substantially their normal straight parallel relationship in close engagement with their adjacent grid bar 8, as shown in FIG. 4. When the receptacle 10 is so mounted on the stove grid 4, a cooking utensil, such as a coffee pot, indicated at 17 in FIG. 3, is placed therein, the marginal flange 12 will confine lateral movement of the pot 17 to a very safe limit on the cooking stove.

For cooking stoves of the type shown, wherein the grids 4 have six radial bars 8, I have found that three anchoring clips 13 are sufficient to securely hold the receptacle 10 against movement relative to the grid 4, the anchoring clips 13 engaging alternate ones of the grid bars 8. For stoves which have grids comprising four such grid arms or bars, a receptacle 10 would be provided having four anchoring clips 13, one for each of the grid bars.

It will be appreciated that, not only does the attachment of this invention effectively prevent undue lateral movement of cooking utensils on a stove, when the attachment is applied thereto but the bottom portion 11 is also highly effective in diffusing heat from the burner 6 over a relatively wide area to aid in the proper cooking of foods on the stove. Further, while the anchoring clips 13 positively hold the receptacle 10 against lateral movement relative to the grid 4, the receptacle 10 may be easily removed vertically from the grid 4 for convenience in cleaning the receptacle 10, grid 4 and adjacent parts of the stove.

What I claim is:

1. An attachment for stoves having burner grids including cooking utensil supporting radial bars, said attachment comprising:
  a. an open-topped utensil receiving receptacle having a generally flat bottom portion and a utensil confining marginal flange portion projecting generally upwardly from said bottom portion;
  b. and a plurality of circumferentially spaced anchoring members projecting downwardly from said bottom portion for gripping engagement with given ones of said radial bars said anchoring members comprising inverted generally U-shaped clips each including a base portion underlying the receptacle bottom portion and secured thereto, and a pair of downwardly projecting legs positioned to straddle an adjacent one of said radial bars.

2. The attachment according to claim 1 in which said clips are formed from strips of resilient heat-resistant material, said legs having lower free end portions shaped to define opposed detent elements for releasably holding said clips in engagement with said radial bars.